(12) United States Patent
Dahlberg (10) Patent No.: US 11,573,299 B2
(45) Date of Patent: Feb. 7, 2023

(54) LIDAR SCAN PROFILE PARAMETERIZATION

(71) Applicant: Seagate Technology LLC, Fremont, CA (US)

(72) Inventor: Eric Dahlberg, Eden Prairie, MN (US)

(73) Assignee: Seagate Technology LLC, Fremont, CA (US)

( * ) Notice: Subject to any disclaimer, the term of this patent is extended or adjusted under 35 U.S.C. 154(b) by 318 days.

(21) Appl. No.: 16/891,415

(22) Filed: Jun. 3, 2020

(65) Prior Publication Data
US 2021/0382149 A1 Dec. 9, 2021

(51) Int. Cl.
*H04B 10/00* (2013.01)
*G01S 7/481* (2006.01)
*G01S 17/06* (2006.01)
*G01S 17/931* (2020.01)

(52) U.S. Cl.
CPC ............ *G01S 7/4817* (2013.01); *G01S 17/06* (2013.01); *G01S 17/931* (2020.01)

(58) Field of Classification Search
CPC .................. H04B 10/11; H04B 10/112; H04B 10/1123; H04B 10/114; H04B 10/1143; H04B 10/1149; H04B 10/40; G01S 7/4817; G01S 7/4815; G01S 7/4816; G01S 17/42; G01S 17/08; G01S 17/10; G01S 17/931; G01S 17/89; G02B 26/0816; G02B 26/10
USPC ....... 398/169, 170, 118, 119, 127, 128, 129, 398/130, 131, 135, 136, 158, 159, 172; 356/4.01, 5.01, 3.01, 4.1
See application file for complete search history.

(56) References Cited

U.S. PATENT DOCUMENTS

| | | | |
|---|---|---|---|
| 10,209,359 B2 | 2/2019 | Russell et al. | |
| 10,509,110 B2 | 12/2019 | Jungwirth et al. | |
| 2018/0284286 A1* | 10/2018 | Eichenholz | ............ G01S 17/89 |
| 2018/0306905 A1 | 10/2018 | Kapusta et al. | |
| 2019/0146060 A1 | 5/2019 | Qiu et al. | |
| 2019/0383911 A1* | 12/2019 | Zhang | ............... G02B 26/10 |
| 2020/0033474 A1 | 1/2020 | Petit | |
| 2020/0096639 A1 | 3/2020 | Panas et al. | |
| 2020/0110160 A1 | 4/2020 | Eldada et al. | |
| 2020/0150247 A1* | 5/2020 | Ledbetter | ............. G01S 7/4815 |

* cited by examiner

*Primary Examiner* — Hanh Phan
(74) *Attorney, Agent, or Firm* — Faegre Drinker Biddle & Reath LLP (57) ABSTRACT

A method includes detecting an object using a first light scan profile and, in response to detecting the object, using a second light scan profile with increased resolution in a region of interest relative to the first scan profile. The second light scan profile is based, at least in part, on a width of the region of interest, a number of scanlines for the region of interest, and an angular offset to the region of interest.

20 Claims, 7 Drawing Sheets

LIDAR SCAN PROFILE PARAMETERIZATION

SUMMARY

In certain embodiments, a method includes detecting an object using a first light scan profile and, in response to detecting the object, using a second light scan profile with increased resolution in a region of interest relative to the first scan profile. The second light scan profile is based, at least in part, on a width of the region of interest, a number of scanlines for the region of interest, and an angular offset to the region of interest.

In certain embodiments, device includes a light source configured to emit pulsed light, a horizontal beam steerer configured to steer the emitted pulsed light along horizontal scanlines, a vertical beam steerer configured to steer the emitted pulsed light along vertical direction, and a beam controller configured to control the vertical beam steerer to steer the emitted pulsed light along a light scan profile. The light scan profile includes a first period of time and a second period of time. During the first period of time, resolution gradually increases from a first resolution value to a second resolution value over multiple scanlines. During the second period of time, resolution is maintained at the second resolution value over multiple scanlines.

In certain embodiments, system includes a host light detection and ranging (LIDAR) system and a LIDAR device communicatively coupled to the host LIDAR system. The LIDAR device is configured to receive commands indicating a width of a region of interest, a number of scanlines for the region of interest, and an angular offset to the region of interest. The LIDAR device is configured to emit pulsed light along a light scan profile that is based on the received width of the region of interest, number of scanlines for the region of interest, and angular offset to the region of interest.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope of the appended claims.

DETAILED DESCRIPTION

Certain embodiments of the present disclosure relate to measurement devices and techniques, particularly, measurement devices and techniques for light detection and ranging, which is commonly referred to as LIDAR, LADAR, etc. LIDAR devices can be used with vehicles such as autonomous or semi-autonomous vehicles. For example, LIDAR devices can transmit pulsed light from a vehicle and that pulsed light may be reflected back from objects surrounding the vehicle. The reflected light is detected by sensors (e.g., optical sensors such as photodetectors), which in turn generate sensor signals. The sensor signals are used by LIDAR devices (or separate data processing devices) to determine the distance between the LIDAR device and the object(s) that reflected the light. Thus, the sensor signals are used to detect objects around the vehicle.

When an object is detected, LIDAR devices may direct more light to a region of interest where the object was detected to increase the resolution of the LIDAR system. Certain embodiments of the present disclosure are directed to selecting or creating light scan profiles to increase resolution at and around one or more regions of interest.

Figure 1:
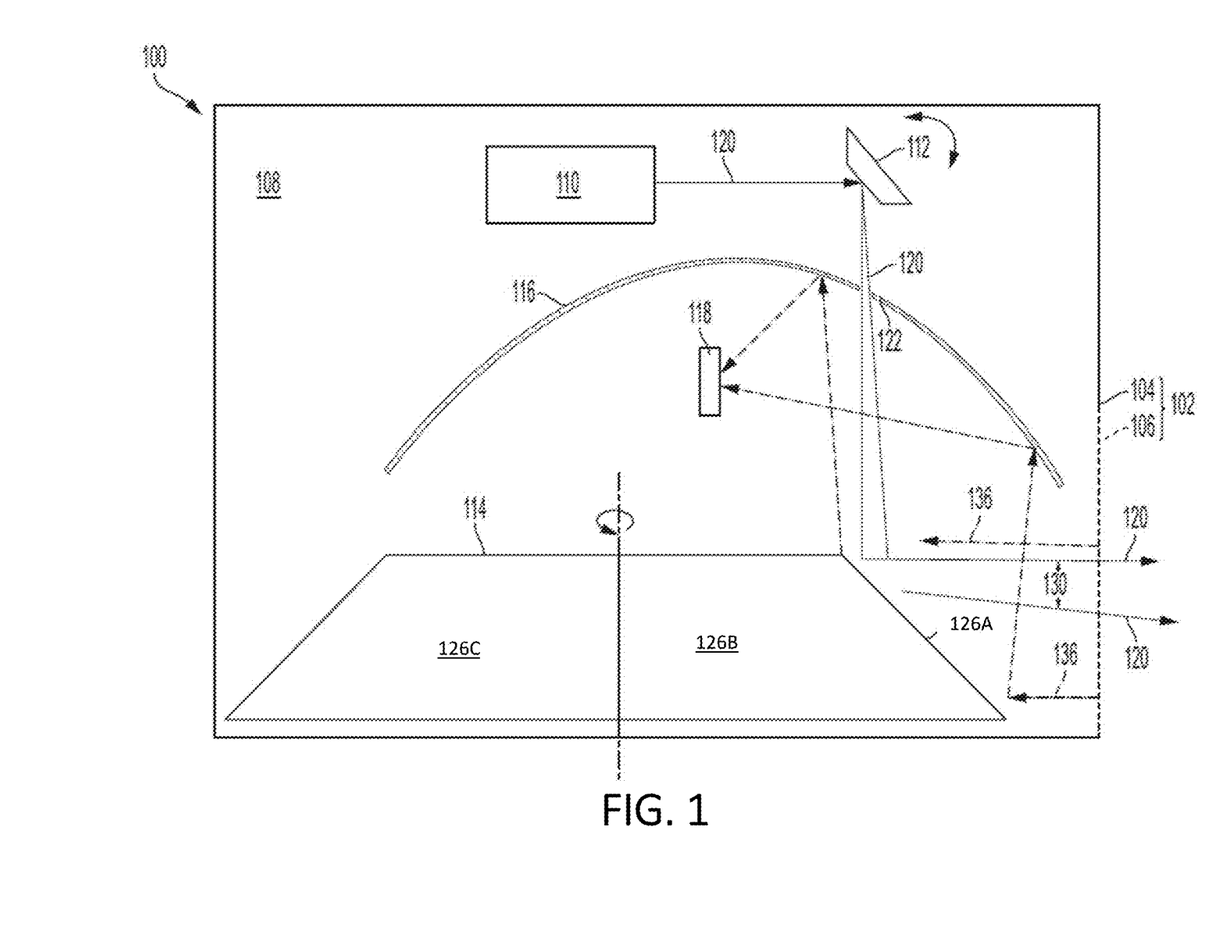
FIG. 1 shows a schematic, cut-away view of a measurement device with a rotating mirror and a curved mirror, in accordance with certain embodiments of the present disclosure.

FIG. 1 shows a schematic of a measurement device 100 (e.g., a LIDAR/LADAR device) including a housing 102 with a base member 104 and a cover 106. The base member 104 and the cover 106 can be coupled together to surround an internal cavity 108 in which various components of the measurement device 100 are positioned. In certain embodiments, the base member 104 and the cover 106 are coupled together to create an air and/or water-tight seal. For example, various gaskets or other types of sealing members can be used to help create such seals between components of the housing 102. The base member 104 can comprise materials such as plastics and/or metals (e.g., aluminum). The cover 106 can comprise, in whole or in part, transparent materials such as glass or sapphire. In certain embodiments, various components of the housing 102 is coated with an antireflective coating. For simplicity, the housing 102 in FIG. 1 is shown with only the base member 104 and the cover 106, but the housing 102 can comprise any number of components that can be assembled together to surround the internal cavity 108 and secure components of the measurement device 100. Further, the base member 104 may be machined, molded, or otherwise shaped to support the components of the measurement device 100. The features of the measurement device 100 and other measurement devices described herein are not necessarily drawn to scale. The figures are intended to show examples of how the features of the measurement devices can be arranged to create scanning patterns of light that are emitted from and scattered back to the measurement devices. For example, the figures show how the features of the measurement devices are physically arranged with respect to each. Further, the figures show example arrangements of optical elements within optical paths that create patterns of light and detect light scattered back to the measurement devices.

The measurement device 100 includes a light source 110 (e.g., a laser), a rotatable mirror 112 (e.g., a mirror-on-a-chip, electro-thermal-actuated mirror, or the like), a reflecting apparatus 114 (e.g., a rotatable pyramidal-shaped mirror), a focusing apparatus 116 (e.g., a lens or a parabolic mirror), and a detector 118 (e.g., a sensor).

The light source 110 can be a laser (e.g., laser diodes such as VCSELs and the like) or a light-emitting diode configured to emit coherent light. In certain embodiments, the light source 110 emits light (e.g., coherent light) within the infrared spectrum (e.g., 905 nm and 1515 nm frequencies are non-limiting examples) while in other embodiments the light source 110 emits light within the visible spectrum (e.g., 485 nm frequency as a non-limiting example). In certain embodiments, the light source 110 is configured to emit light in pulses.

The light emitted by the light source 110 is directed towards the reflecting apparatus 114. The emitted light and its direction are represented in FIG. 1 by arrows 120. In certain embodiments, the emitted light 120 is first directed towards the rotatable mirror 112, which reflects the light towards the reflecting apparatus 114. The rotatable mirror 112 can be a mirror galvanometer (e.g., a voice-coil-based actuation device) or a silicone-based Micro Electro Mechanical Systems (MEMS) mirror, which is sometimes referred to as a mirror-on-a-chip. The rotatable mirror 112 can rotate around an axis such that the emitted light is scanned back and forth along a line. Put another way, the rotatable mirror 112 can be used to steer the emitted light 120 along a line and towards the reflecting apparatus 114. As shown in FIG. 1, the rotatable mirror 112 is angled at a nominal angle of 45 degrees with respect to the emitted light 120 from the light source 110 such that the emitted light 120 is reflected at a nominal angle of 90 degrees. In certain embodiments, the rotatable mirror 112 is configured to rotate around the axis within ranges such as 1-20 degrees, 5-15 degrees, and 8-12 degrees. Using a 10-degree range of rotation as an example, the emitted light 120 would be reflected back and forth between angles of 85 degrees and 95 degrees as the rotatable mirror 112 rotates back and forth within its range of rotation. As will be described in more detail below, the range of rotation affects the extent or displacement of the line scan created by the rotatable mirror 112.

Figure 2:
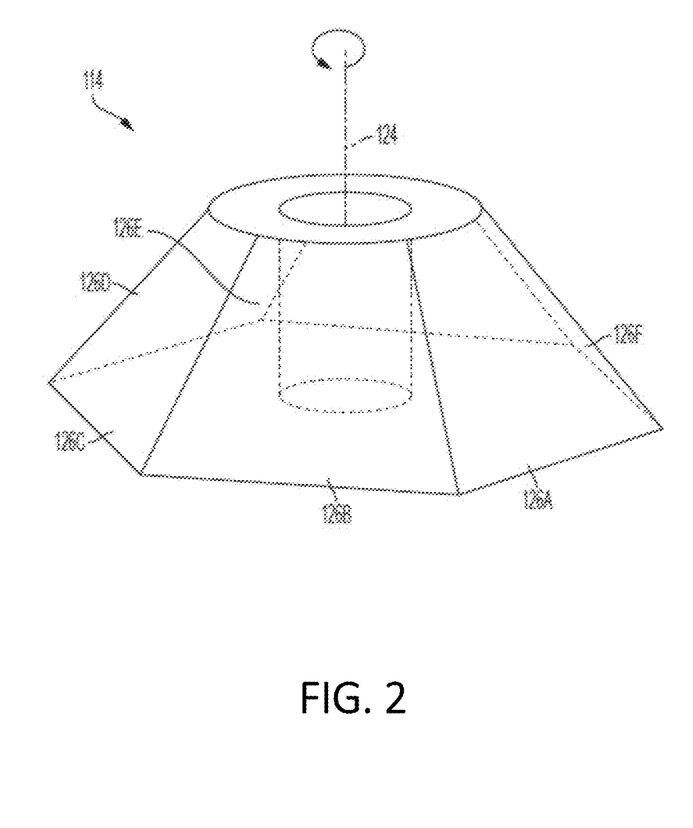
FIG. 2 shows a perspective view of a reflecting apparatus and a motor, in accordance with certain embodiments of the present disclosure.

In certain embodiments, the emitted light 120 reflected by the rotatable mirror 112 (which creates a line scan over time) passes through an aperture 122 in the focusing apparatus 116 towards the reflecting apparatus 114. An exemplary reflecting apparatus 114 is shown in FIG. 2 and can be described as a six-sided (or hexagonal) pyramidal-shaped rotating mirror. The reflecting apparatus 114 can be at least partially created using three-dimensional printing, molding, and the like. The reflecting apparatus 114 is coupled to a cylindrical-shaped motor 124 that rotates the reflecting apparatus 114 during operation of the measurement device 100. Increasing rotational speed of the motor 124 (and therefore the rotational speed of the reflecting apparatus 114) increases the sampling rate of the measurement device 100 but also increases the power consumed by the measurement device 100. The motor 124 can be a fluid-dynamic-bearing motor, a ball-bearing motor, and the like. Although the motor 124 is shown as being centrally positioned within the reflecting apparatus 114, the reflecting apparatus 114 can be rotated via other means, including means other than the motor 124 shown in FIG. 2.

The reflecting apparatus 114 comprises a plurality of facets/faces 126A-F. Each facet 126A-F includes or otherwise incorporates a reflective surface such as a mirror. For example, a mirror can be attached to each facet 126A-F of the reflecting apparatus 114. Although the reflecting apparatus 114 is shown and described as having six facets at an approximately 45-degree angle, the reflecting apparatus can have fewer or more facets (e.g., 3-5 facets, 7-24 facets) at different angles (e.g., 0-90 degrees). The number of facets affects the displacement of the emitted light 120. For example, as the reflecting apparatus 114 rotates, the emitted light 120 directed towards the reflecting apparatus 114 will be reflected and scanned along a line. The overall displacement of the line is dependent on the number of facets on the reflecting apparatus 114. When the reflecting apparatus 114 includes six facets, 126A-F, the resulting line that the emitted light 120 is scanned along has a displacement of sixty degrees (i.e., 360 degrees divided by the number of facets, which is six). This displacement affects the field of view of the measurement device 100.

Figure 3:
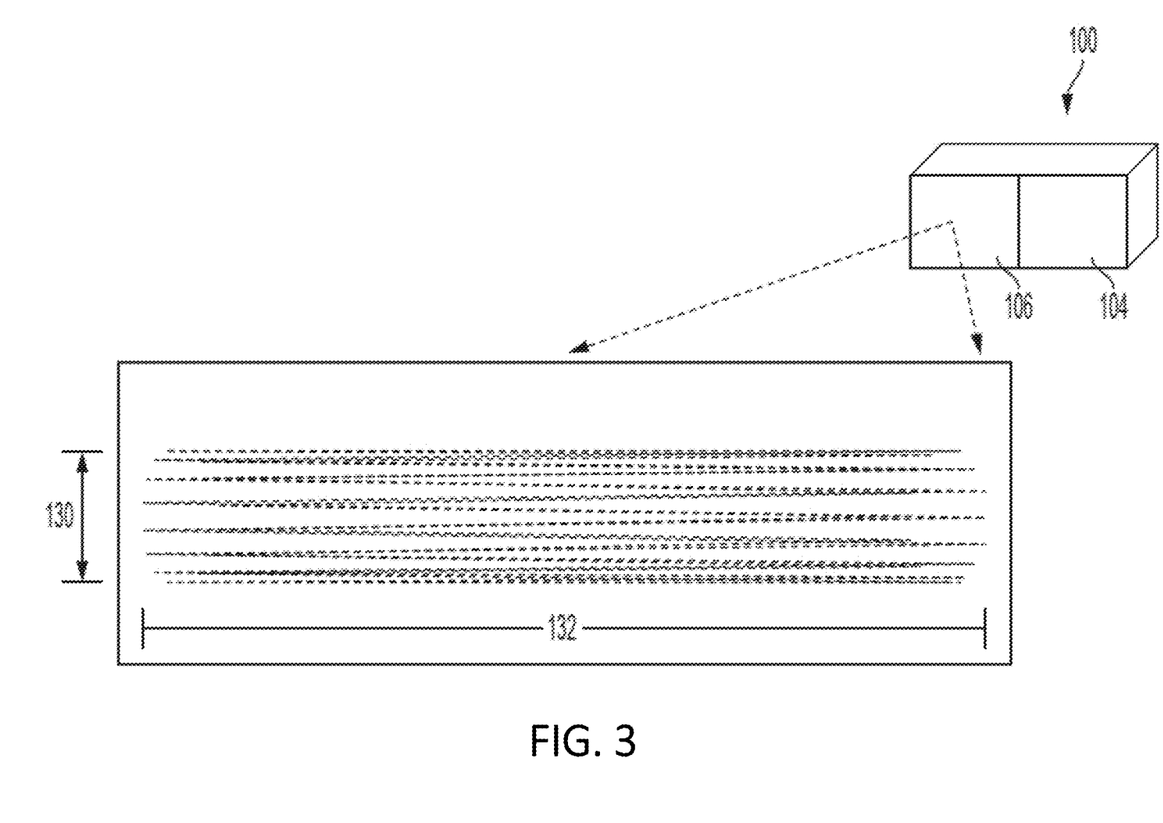
FIG. 3 shows a schematic, perspective view of the measurement device of FIG. 1 and an example light pattern generated by the measurement device, in accordance with certain embodiments of the present disclosure.

When the scan line created by the rotatable mirror 112 is reflected by the rotating reflective apparatus 114, a resulting light pattern 128 or light path is created, similar to that shown in FIG. 3. The light pattern 128 has a vertical component 130 and a horizontal component 132 that makeup the field of view of the measurement device 100. The horizontal component 132 (or displacement) portion of the light pattern 128 is created by the rotating reflective apparatus 114, and the vertical component 130 is created by the rotatable mirror 112. When the rotatable mirror 112 rotates within a 10-degree range of angles and the reflecting apparatus 114 includes six facets 126A-F, the vertical component 130 of the light pattern 128 is 10 degrees and the horizontal component 132 is 60 degrees. As such, the measurement device 100 can be said to have a 10-degree by 60-degree field of view.

The emitted light is transmitted out of the housing 102 (e.g., through the translucent cover 106) of the measurement device 100 towards objects. A portion of the emitted light reflects off the objects and returns through the cover 106. This light, referred to as backscattered light, is represented in FIG. 1 by multiple arrows 136 (not all of which are associated with a reference number in FIG. 1). In certain embodiments, the backscattered light 136 is reflected by the same facet on the reflecting apparatus 114 that the emitted light 120 reflected against before being transmitted out of the housing 102. After being reflected by the reflecting apparatus 114, the backscattered light 136 is focused by the focusing apparatus 116.

Figure 4:
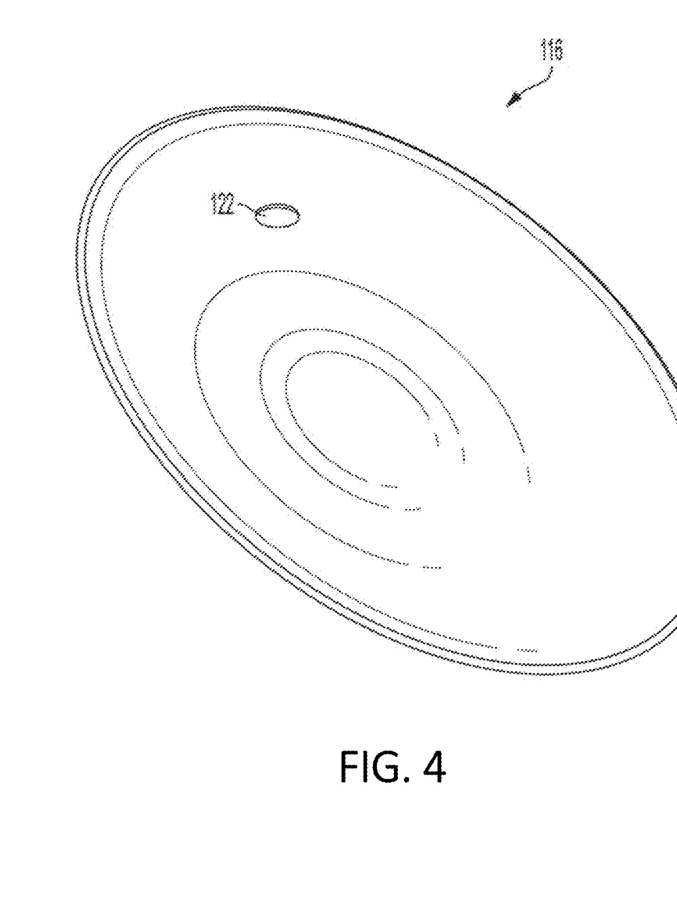
FIG. 4 shows a perspective view of a curved mirror, in accordance with certain embodiments of the present disclosure.

The focusing apparatus 116 is an optical element that focuses the backscattered light 136 towards the detector 118. For example, the focusing apparatus 116 can be a lens or a curved mirror such as a parabolic mirror. FIG. 1 shows the focusing apparatus 116 as a parabolic mirror with its focal point positioned at the detector 118. FIG. 4 shows a perspective view of the focusing apparatus 116 in the shape of a parabolic mirror extending around a full 360 degrees. The particular shape, size, position, and orientation of the focusing apparatus 116 in the measurement device 100 can depend on, among other things, the position of the detector(s) 118, where the path(s) at which backscattered light 136 is directed within the housing 102, and space constraints of the measurement device 100.

In certain embodiments, the focusing apparatus 116 focuses backscattered light to the detector 118, such as one or more photodetectors/sensors arranged in one or more arrays. The detector 118 can be positioned at the focal point of the focusing apparatus 116. In response to receiving the focused backscattered light, the detector 118 generates one or more sensing signals, which are ultimately used to detect the distance and/or shapes of objects that reflect the emitted light back towards the measurement device 100 and ultimately to the detector 118.

In certain embodiments, the measurement device 100 and the other measurement devices described below can generate multiple light patterns. For example, the measurement device 100 can include multiple light sources or include a beam splitter to create multiple light paths from a single light source. In such embodiments, each light beam would be directed towards separate facets on the reflecting apparatus 114. Using a six-faceted reflecting apparatus 114 as an example, a measurement device that directs light to two of the reflecting apparatus's facets would have either a 120-degree horizontal field of view or up to two separate 60-degree horizontal fields of view. For a 360-degree horizontal field of view, a measurement device could include six separate light beams (via multiple light sources and/or one or more beam splitters) each reflecting off a separate facet of the rotating apparatus 114.

As noted above, when an object is detected, the LIDAR device 100 may direct more emitted light 120 to a region of interest where the object was detected to increase the resolution of the LIDAR system. For example, when the LIDAR device 100 is positioned on a vehicle and the LIDAR system detects an object such as road debris or another vehicle, the LIDAR device 100 may modify subsequent scans to have higher resolution in and around the region of the detected object. Directing more of the emitted light 120 to the region will increase the resolution of the LIDAR system in that region which will likely increase the accuracy of the LIDAR system in that region.

The resolution in the vertical component 130 of the light pattern 128 can be increased by decreasing the rate at which the rotatable mirror 112 rotates (or by effecting a change in the scanning rate along the vertical component 130 via another component for LIDAR devices without a rotating mirror). Decreasing the scanning rate in the vertical component 130 will increase the amount of emitted light 120 that is directed to a given area over a given period of time.

The resolution in the horizontal component 132 of the light pattern 128 can be increased by increasing the fire or pulse rate of the light source 110 and/or decreasing the speed at which the motor 124 rotates the reflecting apparatus 114 (or by effecting a change in the scanning rate along the horizontal component 132 via another component for LIDAR devices without a reflecting apparatus described above).

Figure 5:
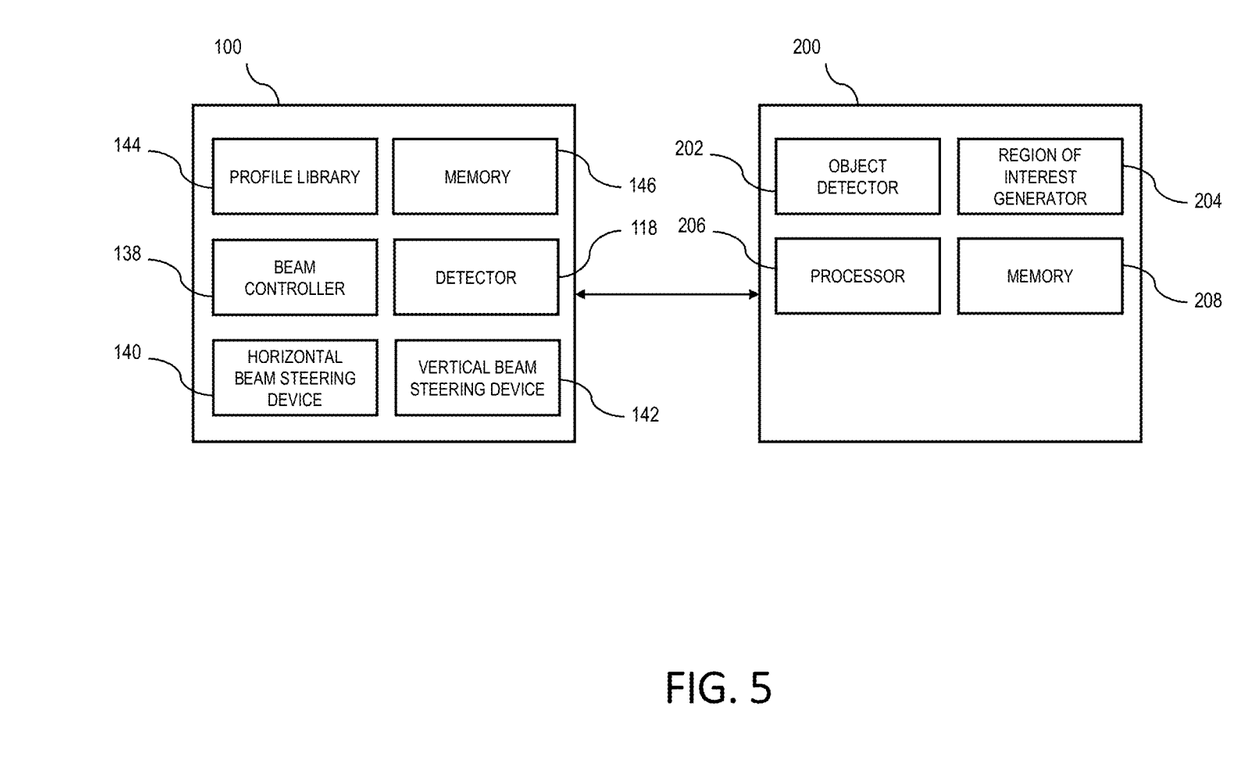
FIG. 5 shows a block diagram of the LIDAR device of FIG. 1 in communication with a host LIDAR system, in accordance with certain embodiments of the present disclosure.

FIG. 5 shows a block diagram of features of the LIDAR device 100, which is communicatively coupled to a host LIDAR system 200 (herein after "the system 200"). The system 200 includes an object detector 202, a region of interest generator 204, a processor 206 (e.g., microprocessor), and memory 208. In certain embodiments, the processor 206 and memory 208 are components of a controller that carries out the functions of the object detector 202 and the region of interest generator 204.

The LIDAR device 100 includes a beam controller 138, a horizontal beam steering device 140, a vertical beam steering device 142, a profile library 144, memory 146, and the detector 118.

In certain embodiments, the beam controller 138 provides control signals to the horizontal beam steering device 140 and the vertical beam steering device 142 to control the path or profile of the emitted light 120. For example, the beam controller 138 can determine the amount of voltage or current that is applied to the components of the horizontal beam steering device 140 and the vertical beam steering device 142 to effect a change in those devices. The beam controller 138 can include at least one processor that executes software and/or firmware stored in the memory 146. The software/firmware code contains instructions that, when executed by the processor, cause the controller 138 to perform the functions described herein. The controller 138 may alternatively or additionally include one or more application-specific integrated circuits (ASICs), field-programmable gate arrays (FPGAs), digital signal processors (DSPs), hardwired logic, or combinations thereof.

In certain embodiments, the horizontal beam steering device 140 is the reflecting apparatus 114 described above while in other embodiments the LIDAR device 100 may include a different type of horizontal beam steering device. In certain embodiments, the vertical beam steering device 142 is the rotatable mirror 112 described above while in other embodiments the LIDAR device 100 may include a different type of vertical beam steering device. As noted above, the LIDAR device 100 can include additional components that, for simplicity of explanation, are not specifically shown in FIG. 5. Further, although the object detector 202 and the region of interest generator 204 are shown as being part of the system 200, the LIDAR device 100 itself may have such components or similar components.

Figure 6:
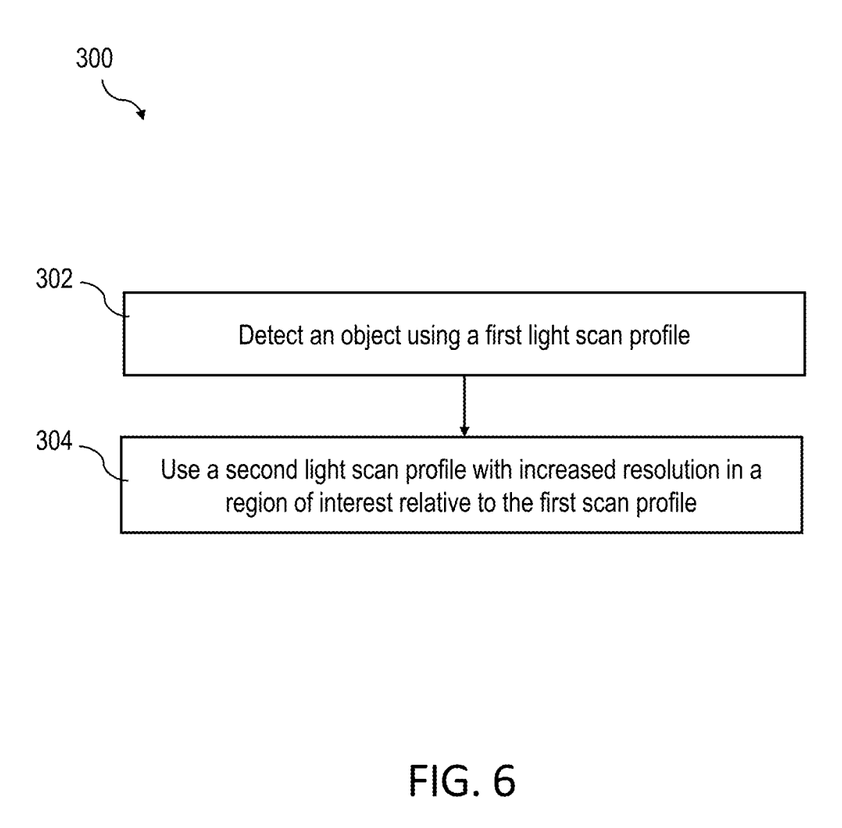
FIG. 6 shows a block diagram of steps of a method, in accordance with certain embodiments of the present disclosure.

FIG. 6 outlines a method 300 that can be carried out by the LIDAR device 100. In certain embodiments, the LIDAR device 100 produces the emitted light 120 along a first light scan profile (block 302 in FIG. 6). The first light scan profile (and subsequent light scan profiles described below) may consist of a series of light pulses that are directed along horizontal scan lines at different vertical heights within the LIDAR device's field of view. Further, the first light scan profile may have a fixed or uniform resolution along the various horizontal scan lines. The beam controller 138 can control the horizontal beam steering device 140 and the vertical beam steering device 142 to generate the first light scan profile.

In the event the LIDAR device 100 or the system 200 (e.g., via its object detector 202 component) detects an object within the LIDAR device's field of view, the LIDAR device 100 or the system 200 may determine to increase resolution during one or more subsequent scans. In addition to detecting an object, the LIDAR device 100 or the system 200 (e.g., via its region of interest generator 204) may determine where in the field of view the object was detected and thus identify that area as a region of interest. As such, the LIDAR device 100 can emit the emitted light 120 along a second light scan profile with increased resolution in the region of interest relative to the first scan profile (block 302 in FIG. 6).

In certain embodiments, the second light scan profile is selected from a pre-determined number of light scan profiles. For example, the profile library 144 of the LIDAR device 100 (which can be stored in the memory 146) can include a table of light scan profiles that can be selected based on various criteria determined by the LIDAR device 100 or the system 200. In other embodiments, the second light scan profile is generated based on various criteria but without use of the profile library 144.

In certain embodiments, the criteria used to select or otherwise create (if not using the profile library 144) the second light scan profile includes a width of the region of interest, a number of scanlines for the region of interest, and an angular offset to the region of interest. The width of the region of interest can take different forms, including indicating the vertical width or span of the region of interest in terms of degrees. The number of scanlines for the region of interest can be—depending on the orientation of the LIDAR device 100—the number of horizontal scanlines within the region of interest. The angular offset to the region of interest can be positive or negative and indicates how far from the LIDAR device's total vertical span midpoint the region of interest span midpoint should be offset. For example, if the angular offset is 0, the center of the region of interest will be located in the center of the total vertical span of the LIDAR device's field of view. The angular offset allows the region of interest to be shifted up or down relative to the rest of the LIDAR device's vertical span.

Figure 7A:
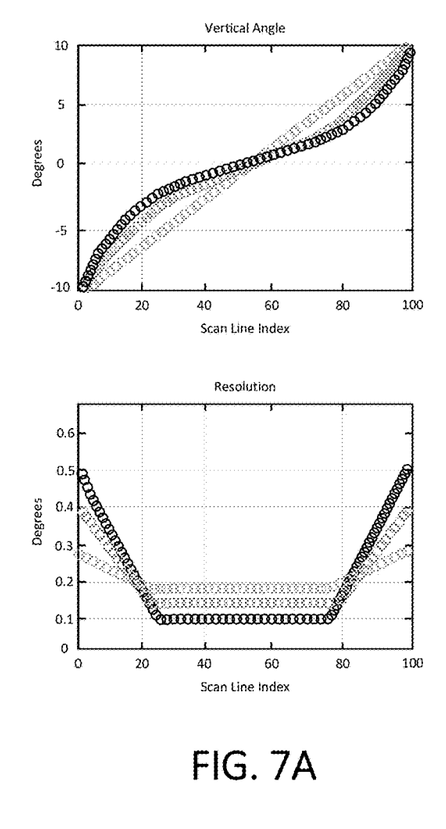
FIGS. 7A-C show various light scan profiles and resulting resolution along the light scan profiles, in accordance with certain embodiments of the present disclosure.
Figure 7B:
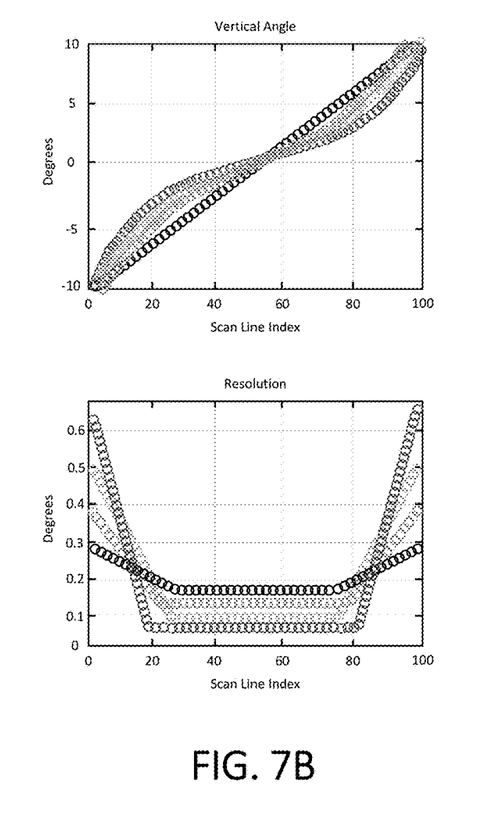
Figure 7C:
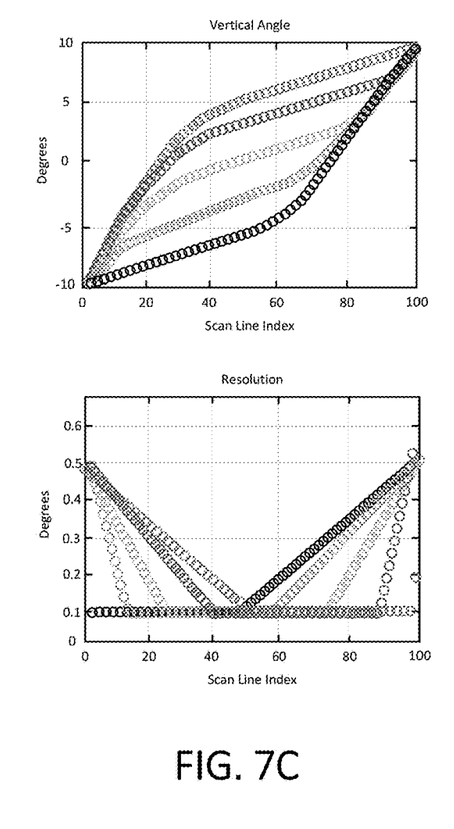

FIGS. 7A-C features various example plots of light scan profiles and responsive resolution profiles. In FIGS. 7A-C, the top plots show different light scan profiles and the bottom plots show respective resolution profiles resulting from the light scan profiles. In the plots, each circle represents a single horizontal scan line. The top plots show the vertical angle of the vertical beam steering device 142 with each horizontal scan line. The plots are shown in different shading such that the darkest shaded circles in the top plot correspond to darkest shaded circles in the bottom plots.

FIG. 7A shows the effect of fixing the number of scanlines to be used in the region of interest and changing the width of the region of interest. As the region of interest (e.g., in a span of degrees) becomes smaller, the resolution increases.

FIG. 7B shows the effect of fixing the width of the region of interest and increasing the number of scanlines to be used within the region of interest. As the number of scanlines within the region of interest increases, the resolution within that range increases.

FIG. 7C shows the effect of applying an offset to the region of interest, thereby allowing the region of interest to be oriented from the bottom through to the top of the field of view.

A given light scan profile can be selected or created in response to determining the position of the detected object within the LIDAR device's field of view. Once the position is determined, a particular combination of the width of the region of interest, number of scanlines for the region of interest, and angular offset to the region of interest can be chosen to establish a particular light scan profile. For example, in response to detecting an object in the left side of the LIDAR device's field, a light scan profile can be selected or created such that the increased resolution is directed to the left side of the field of view.

As shown in the various plots in FIGS. 7A-C, there are periods of time where the resolution resulting from the light scan profiles increases, is constant, or decreases. In some examples, the light scan profile results in a first period of time with increasing resolution followed by a second period of time with constant resolution. Further, in some examples, the constant resolution is followed by a third period of time with decreasing resolution. In other examples, the light scan profile results in a first period of time with increased constant resolution followed by a second period of time with decreasing resolution. In certain embodiments, the period of time with constant increased resolution overlaps with a center of the determined region of interest. As noted above, the periods of increased resolution can be accomplished by varying a vertical scan angle (e.g., varying the angle of the rotatable mirror 112).

As shown in the various plots in FIGS. 7A-C, the periods of time with constant increased resolution are surrounded by one or more periods of gradually increasing or gradually decreasing resolution. These regions can be considered to be resolution transition regions and they include gradual or smooth—rather than abrupt—increases or decreases in resolution along the light scan profiles around the region of interest.

These resolution transition regions are useful in the context of autonomous or semi-autonomous vehicle systems. As the LIDAR device 100 or the system 200 detects an object (e.g., a tire, a pothole, or a ball rolling into a street), a higher resolution can be applied in the region of interest. The resolution transition regions outside of the region of interest allow for relatively higher resolution outside of the region of interest such that objects continue to be tracked or detected. For example, as the detected object and the vehicle (and therefore the LIDAR device 100) move relative to each other, the detected object's position within the field of view will change. The resolution transition regions help maintain a relatively increased resolution outside the initial region of interest and the detected object such that the LIDAR device 100 and/or the system 200 can accurately track the detected object along the field of view.

Although the plots shown in FIGS. 7A-C and described above feature only one period of constant increased resolution, the light scan profiles can include multiple distinct periods of constant increased resolution. For example, multiple objects may be detected, and multiple periods of increased resolution in a given light scan profile can therefore be applied. Further, each distinct period of increased resolution can be surrounded by one or more periods of ramping up and ramping down resolution.

The slopes (represented by the term $m_g$ in Equation 4 below) of the resolution transition regions (e.g., the periods of increasing resolution and decreasing resolution) can be determined as follows. In short, the equations outlined below show that the slopes can be created using the horizontal and vertical spans of the region(s) of interest and the number of scan lines to allocate to each.

Given "n" number of horizontal scan lines to be distributed across the vertical component 130 of the light pattern 128, we can divide the scan line into groups where $n=n_f+n_b+n_a$ and span $s=s_f+s_b+s_a$—where $n_f$, $n_b$, and $n_a$ correspond respectively to number of scan lines in the focus region, below the focus region, and above the focus region and $s_f$, $s_b$, and $s_a$ correspond to the angular span of the focus region, below the focus region, and above the focus region.

The resolution between scan lines in the focus region is given by the following Equation 1 (where $n_f$ must be $\geq 2$):

$$res_f = s_f/(n_f-1) \qquad \text{Equation 1}$$

The resolution between scan lines above and below the region of focus can be computed independently using the following Equation 2 (where the subscripts a and b are replaced with the generalized g subscript):

$$res_g(d) = res_f + m_g * d \qquad \text{Equation 2}$$

where d is the distance in terms of scan line counts of the present scan line to its nearest focus region boundary scan line.

When n and s are fixed, we can compute the value of $m_g$, the slopes. When $s_g$ is non-zero, $n_g$ is also non-zero, given that Equation 3 notes that:

$$s_g = \sum_{d=1}^{n_g} res_f + m_g * d = \qquad \text{Equation 3}$$

-continued $$n_g * res_f + m_g * \sum_{d=1}^{n_g} d = n_g * res_f + m_g * \frac{n_g(n_g + 1)}{2}$$

Solving for $m_g$ via Equation 4:

$$m_g = (s_g - n_g * res_f) * \frac{2}{n_g(n_g + 1)} \qquad \text{Equation 4}$$

As shown above, the only required inputs for generating gradual or smooth resolution transition regions are the horizontal and vertical spans of the region(s) of interest and the number of scan lines to allocate to each. As a result, the LIDAR device 100 and/or the system 200 does not necessarily need to use a large amount of processing power to specify a light scan profile in response to detecting an object or dedicate a large amount of memory for storing different scan profiles.

In certain embodiments, the various light scan profiles shown in FIGS. 7A-C can be reversed (or are negative versions) such that there are one or more periods of constant decreased resolution. In certain embodiments, a vehicle may have multiple LIDAR devices (e.g., stacked LIDAR devices) with overlapping or partially overlapping fields of views. The approaches described above can be used simultaneously with multiple LIDAR devices. For example, the LIDAR devices can be synchronized such that the light scan profiles for the LIDAR devices have synchronized periods of increasing resolution, constant increased resolution, and/or decreasing resolution.

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

I claim:

1. A method comprising:
 detecting an object using a first light scan profile; and
 in response to detecting the object, generating a second light scan profile with increased resolution in a region of interest relative to the first light scan profile, wherein the second light scan profile is based, at least in part, on a width of the region of interest, a number of scanlines for the region of interest, and an angular offset to the region of interest, wherein the second light scan profile includes a first period of increasing resolution and a second period of constant increased resolution.

2. The method of claim 1, wherein the second light scan profile is determined based only on the width of the region of interest, the number of scanlines for the region of interest, and the angular offset to the region of interest.

3. The method of claim 1, wherein using the first light scan profile includes emitting pulsed light along the first light scan profile, wherein using the second light scan profile includes emitting pulsed light along the second light scan profile.

4. The method of claim 1, wherein the second light scan profile includes a third period of decreasing resolution.

5. The method of claim 4, wherein the increasing resolution of the first period includes linearly increasing resolution.

6. The method of claim 4, wherein the second period of constant increased resolution overlaps a center of the region of interest.

7. The method of claim 1, wherein the increased resolution is accomplished by varying a vertical scan angle along the second light scan profile.

8. The method of claim 7, wherein varying the vertical scan angle is carried out by a rotatable mirror.

9. The method of claim 1, wherein the region of interest with the increased resolution is surrounded by gradual resolution transition regions.

10. The method of claim 1, wherein the second light scan profile includes multiple different regions of interest with increased resolution relative to the first scan profile.

11. The method of claim 1, wherein the second light scan profile is selected from a library of light scan profiles each based on the width of the region of interest, the number of scanlines for the region of interest, and the angular offset to the region of interest.

12. A device comprising:
 a light source configured to emit pulsed light;
 a horizontal beam steerer configured to steer the emitted pulsed light along horizontal scanlines;
 a vertical beam steerer configured to steer the emitted pulsed light along vertical direction;
 memory that stores a library of light scan profiles; and
 a beam controller configured to control the vertical beam steerer to steer the emitted pulsed light along the light scan profiles selected from the library, a first of the light scan profiles including a first period of time during which resolution gradually increases from a first resolution value to a second resolution value over multiple scanlines and a second period of time during which resolution is maintained at the second resolution value over multiple scanlines.

13. The device of claim 12, wherein the light scan profile is based, at least in part, on a width of a region of interest, a number of scanlines for the region of interest, and an angular offset to the region of interest.

14. The device of claim 12, wherein the vertical beam steerer is a rotatable mirror.

15. The device of claim 12, wherein the library includes light scan profiles each associated with a different combination of a width of a region of interest, a number of scanlines for the region of interest, and an angular offset to the region of interest.

16. A system comprising:
 a host light detection and ranging (LIDAR) system; and
 a LIDAR device communicatively coupled to the host LIDAR system to receive commands indicating a width of a region of interest, a number of scanlines for the region of interest, and an angular offset to the region of interest, wherein the LIDAR device is configured to emit pulsed light along a light scan profile that is based on the received width of the region of interest, number of scanlines for the region of interest, and angular offset to the region of interest, wherein the light scan profile includes a first period of increasing resolution and a second period of constant increased resolution in the region of interest.

17. The system of claim 16, wherein the commands are based, at least in part, on sensing signal communicated from the LIDAR device to the host LIDAR system.

18. The system of claim 16, wherein the light scan profile includes a third period of decreasing resolution.

19. The system of claim 16, wherein the light scan profile is selected from a library of light scan profiles.

20. The system of claim 19, the library includes light scan profiles each associated with a different combination of a width of a region of interest, a number of scanlines for the region of interest, and an angular offset to the region of interest.

* * * * *